United States Patent

[11] 3,626,938

| [72] | Inventor | Antonio A. Versaci<br>1092 St. Jude Drive, Schenectady, N.Y. 12303 |
|---|---|---|
| [21] | Appl. No. | 51,202 |
| [22] | Filed | June 30, 1970 |
| [45] | Patented | Dec. 14, 1971<br>Continuation-in-part of application Ser. No. 764,542, Oct. 2, 1968, now abandoned. This application June 30, 1970, Ser. No. 51,202 |

[54] HEMODIALYSIS SHUNT VALVE DEVICE WITH BODY CONNECTING MEANS
7 Claims, 7 Drawing Figs.

[52] U.S. Cl. .................................... 128/214 B, 128/274, 137/625.47
[51] Int. Cl. ........................................ A61m 05/00
[50] Field of Search ............................ 128/214 R, 214 B, 214.2, 240, 274; 3/1; 137/625.46, 625.47

[56] References Cited
UNITED STATES PATENTS

| 540,215 | 5/1895 | McElroy ........................ | 137/625.47 |
|---|---|---|---|
| 1,633,074 | 6/1927 | De Mott ........................ | 128/240 |
| 3,482,573 | 12/1969 | Stoever ........................ | 128/214 R |
| 3,526,136 | 9/1970 | Caldwell et al. ............... | 137/625.47 |

FOREIGN PATENTS

| 164,846 | 9/1904 | Germany ..................... | 137/625.47 |
| 719,692 | 12/1954 | Great Britain ................ | 137/625.47 |
| 232,476 | 4/1969 | U.S.S.R. ...................... | 128/214 E |

OTHER REFERENCES
The Search Copy Defensive Publication- Carter, Def. Pub. Search Copy of Serial No. 825,264, filed May 16, 1969, published in 867 O.G.1095, on Oct. 28, 1969

*Primary Examiner*—Dalton L. Truluck
*Attorney*—Hofgren, Wegner, Allen, Stellman & McCord ABSTRACT: A shunt valve device for connecting an artery and vein to a dialysis machine, such as an artificial kidney or the like, including a shunt valve assembly which has a pair of passages extending therethrough and a valve means for selectively opening and closing the passages. The assembly is mounted on a body member of a person and the passages are connected to the artery and vein. The assembly has means for receiving a pair of conduits from the artificial kidney and holding the conduits in communication with the passages through the assembly so that the valve means can be operated to open the passages and thereby connect the artery and vein to the artificial kidney and permit the flow of blood therebetween. When the valve means is closed, the flow of blood is shunted back to the body member. A bubble sensor is provided between the artificial kidney and the shunt valve assembly to close the valve means on sensing a bubble in the stream of blood leading from the artificial kidney to the shunt valve assembly.

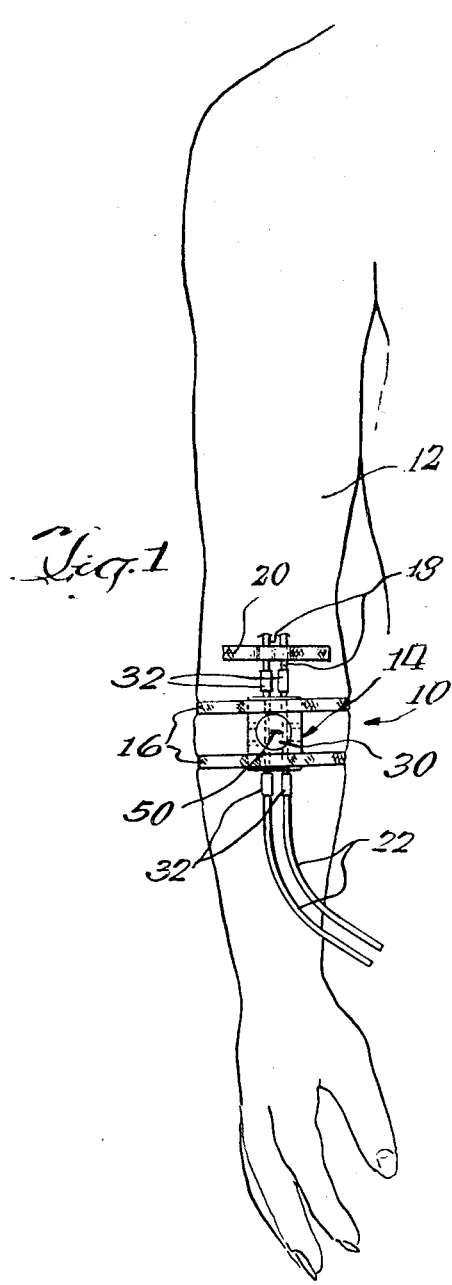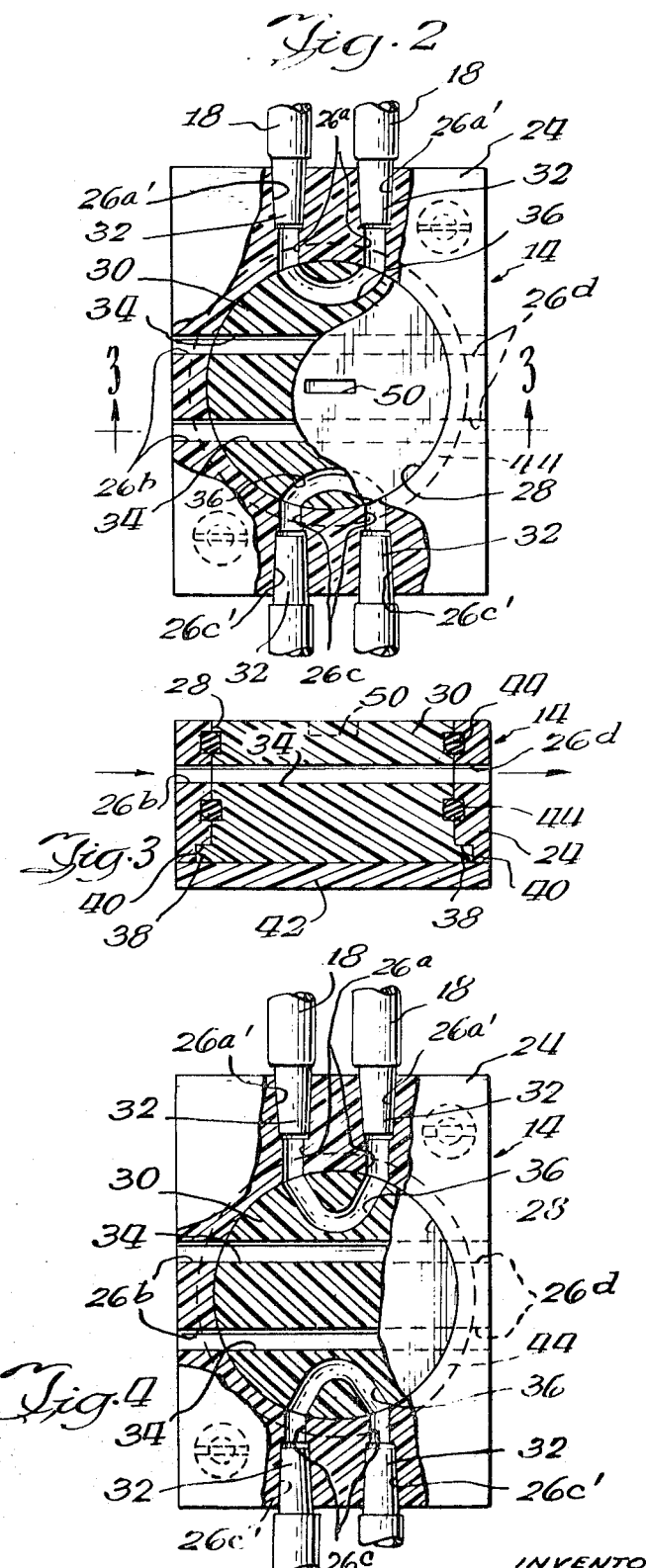

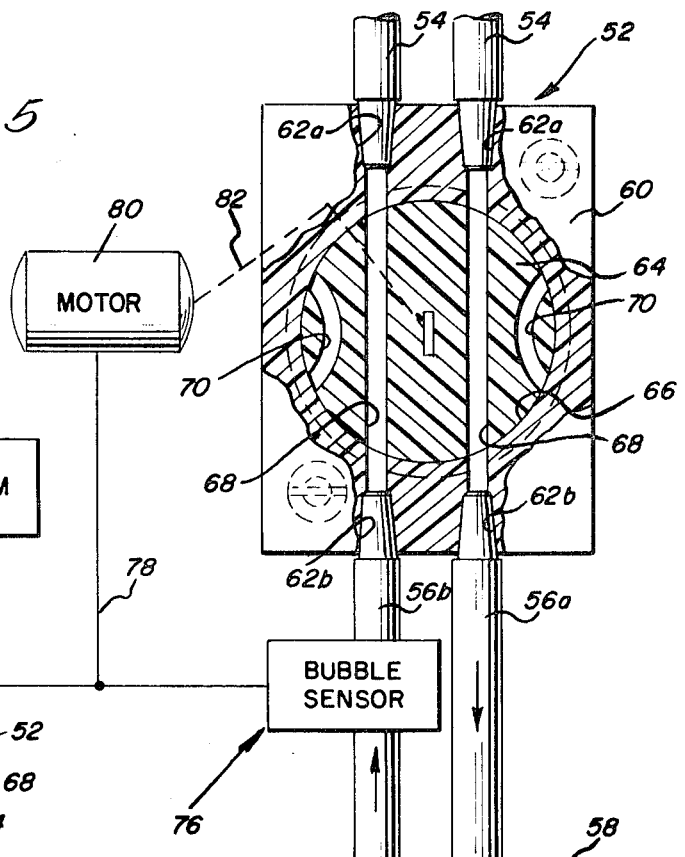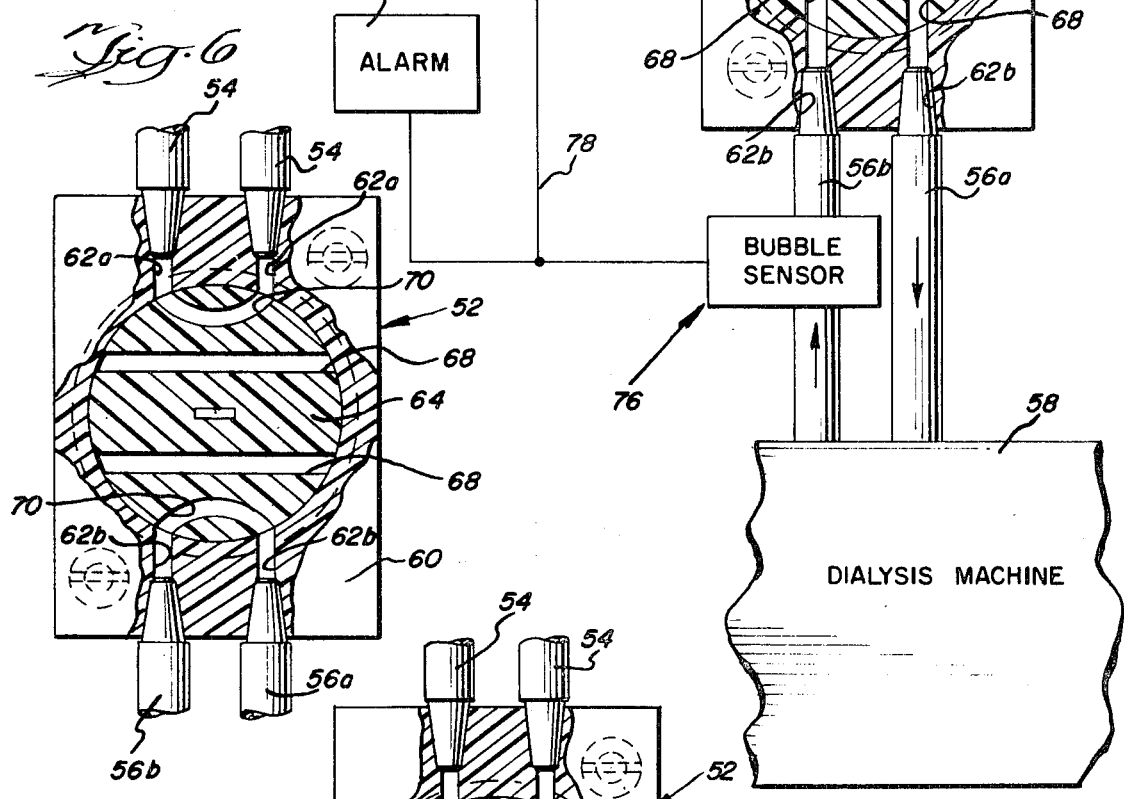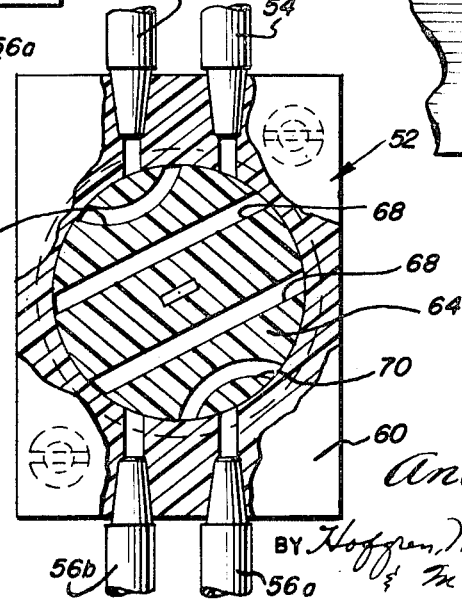

HEMODIALYSIS SHUNT VALVE DEVICE WITH BODY CONNECTING MEANS

BACKGROUND OF THE INVENTION

This is a continuation-in-part of my copending application, Ser. No. 764,542, filed Oct. 2, 1968, and entitled "Shunt" now abandoned.

With the ever increasing use of dialysis machines, such as artificial kidneys, and other organ simulating machines which must be connected into the blood stream of a person, it is desirable to have a means which eliminates the repetitious tapping of the artery and vein, through the skin, to establish communication between the artificial kidney and the person's artery and vein.

SUMMARY OF THE INVENTION

This invention relates to a shunt valve device which is designed to be mounted permanently on a body member of a person and permanently connected to the artery and vein of the person. The device is provided with valve means for selectively connecting the artery and vein to an artificial kidney or the like. The device further has shunt means for directing the flow of blood back to the body member when the device is not operatively connected to the artificial kidney.

The device set forth in the preceding paragraph comprises a shunt valve assembly which has passage means extending therethrough and valve means operable to selectively open and close the passage means, means for mounting the shunt valve assembly on a body member of a person, means for connecting the passage means of said shunt valve assembly to the artery and vein of the person, and means on the assembly for receiving conduit means from the artificial kidney and holding the conduit means in communication with the passage means whereby the valve means can be operated to open the passage means and thereby connect the artery and vein to the artificial kidney and permit the flow of blood therebetween. The passage means is arranged and the valve means is operable so as to shunt the flow of blood back to the body member when the passage means is closed.

An object of the invention is the provision of a shunt valve device of the character described which is easily cleaned either while operatively connected to the artificial kidney or while the flow of blood is shunted back to the body member.

Another feature of the invention is to provide means for sensing bubbles in the stream of blood flowing from the artificial kidney to the shunt valve assembly, the bubble sensing means being operatively connected through an actuator means to the shunt valve assembly to close the valve means automatically on sensing a bubble in said blood stream. An alarm also may be actuated by the bubble sensing device to give a signal when a bubble is sensed.

Other objects, features and advantages of the invention will become apparent from the following detailed description taken in connection with the accompanying drawings.

DESCRIPTION OF THE DRAWINGS

FIG. 1 is a plan view of the shunt valve device of this invention mounted on a human arm and operatively connected to a pair of conduits leading from an artificial kidney or the like (not shown in the drawings);

FIG. 2 is a plan view, partially in section, of the shunt valve device of FIG. 1, on an enlarged scale, and with the components thereof in position to shunt the flow of blood back to the artery and vein;

FIG. 3 is a section taken generally along the line 3—3 of FIG. 2;

FIG. 4 is a plan view, similar to that of FIG. 2, of a slightly modified form of the invention;

FIG. 5 is a plan view, partially in section, of a modified form of shunt valve device shown connected to a dialysis machine, with means for sensing a bubble in the conduit leading from the machine to the shunt valve device;

FIG. 6 is a view of the shunt valve device of FIG. 5, with the rotary shunt valve member in position to shunt the flow of blood back to the artery and vein; and FIG. 7 is a view similar to that of FIG. 6, with the shunt valve member disposed in an off position neither shunting the flow of blood back to the artery and vein nor connecting the artery and vein to the dialysis machine.

DETAILED DESCRIPTION OF THE INVENTION

The invention is illustrated and described herein for use with an artificial kidney. However, it is to be understood that the invention is equally applicable for use with other types of organ simulating machines or any other type of unit which must be connected with the artery and vein of human beings, as well as animals.

The shunt valve device of this invention, generally designated 10, is shown in FIG. 1 mounted on a person's arm 12 inside and slightly below the elbow. The device includes a shunt valve assembly, generally designated 14, which is mounted on the arm 12 by means of a pair of cords or strips of tape 16. A pair of tubular members 18 connects the shunt valve assembly 14 to the artery and vein. The tubular members are tapped into the artery and vein and the ends of the tubes are brought out of the arm and are tied down by a tape 20 or a cord, in accordance with usual medical practice. On the opposite side of the shunt valve assembly 14, a pair of tubular conduits 22 extends from the shunt valve assembly to an artificial kidney or like organ simulating machine (not shown in the drawings). As will be described in greater detail hereinafter, with the tubular conduits 22 from the artificial kidney connected to the shunt valve assembly 14, the shunt valve assembly can be operated to connect the artery and vein, through the tubular members 18 and the tubular conduits 22, to the artificial kidney and permit the flow of blood therebetween. After the required period of time in which the patient uses the artificial kidney, the shunt valve assembly 14 is manipulated to cut off communication with the tubular conduits 22 and shunt the flow of blood back to the artery and vein. The tubular conduits 22 then can be removed and the shunt valve assembly, along with the tubular members 18, remain permanently attached to the patient's arm by means of the strips of tape 16, cords or similar means.

Referring to FIGS. 2 and 4, the shunt valve assembly 14 includes a body member 24 in which are formed four pairs of passages 26a, 26b, 26c, and 26d. The four pairs of passages extend through the body member and are disposed 90° apart and lead outwardly from a central cylindrical recess 28. A rotary shunt valve member 30 is disposed in the cylindrical recess 28 and is operable upon rotation (to various angular positions relative to the body member 24) to open the passages 26a and 26c to connect the artery and vein of the patient to the artificial kidney and permit the flow of blood therebetween or shunt the flow of blood back through the passages 26a to the arm of the patient, when not connected to the artificial kidney. The passages 26a and 26c have outer tapered portions 26a' and 26c', respectively, to receive tapered end plugs 32 on each of the tubular members 18 leading to the artery and vein and on each of the tubular conduits 22 leading to the artificial kidney. The tapered end plugs 32 establish a tight fit with the tapered portions 26a' and 26c' of the passages to prevent any leakage of blood therebetween.

The rotary shunt valve member 30 has a pair of straight "open" passages 34 extending therethrough for connecting either the passages 26a with the passages 26c or the passages 26b with the passages 26d, in the body member 24. The rotary shunt valve member 30 also has a pair of arcuate shunt passages 36, for a purpose to be described hereinafter. As is apparent from FIGS. 2 and 4, there is equal spacing between the passages of each pair of 26a through 26d thereof through the body member 24, and adjacent ends of the open passages 34 and the shunt passages 36 of the shunt valve member 30. As will be described subsequently, the passages 26d in the body member 24 of the shunt valve assembly 14 are provided for the purposes of cleaning the open passages 34 and the shunt passages 36 in the rotary shunt valve member 30.

FIG. 3 shows, in section, how the shunt valve assembly 14 is assembled. The rotary shunt valve member 30 has an outwardly extending flange 38 which seats against a shoulder 40 on the underside of the body member 24 to provide a positive positioning of the rotary member relative to the body member and thereby insure proper alignment of the various passages in the respective members. A cap member 42 is positioned under the rotary member 30 and body member 24 and is secured to the lower marginal edge of the body member 24 by an appropriate adhesive. The cap member 42 is not secured in any manner to the rotary member 30 so as to permit rotation of the rotary member relative to the body member 24 and cap member 42. A pair of O-rings 44 are positioned in complementary recesses in the body member 24 and rotary shunt valve member 30 above and below the respective passages therethrough to prevent the escape of blood between the two members from the various passages extending therethrough. As an alternative, a wide gasket may be positioned between the two members, with holes cut out of the gasket and aligned with the various passages.

A slotlike recess 50 (FIGS. 2 and 3) is cut into the top of the rotary shunt valve member 30 to receive a screwdriver, coin, or the like, to facilitate rotating the member.

The shunt passages 36 through the rotary member 30 preferably are formed arcuately with smooth interior walls to prevent the creation of any turbulences when the flow of blood is shunted back to the artery and vein. In the embodiment shown in FIG. 2, the shunt passages 36 are arc shaped. In the embodiment shown in FIG. 4, the shunt passages 36 are formed by drilling two short straight holes and connecting the inner ends of the holes by an arcuate bore. Aside from preventing turbulences, a smooth contour for the shunt passages 36 is desirable to prevent the clotting of blood within the passages.

The body member 24, rotary member 30 and cap member 42 of the shunt valve assembly 14 preferably are fabricated of transparent thermoplastic or like material to permit visual observation of the functioning of the device.

In operation, the device of this invention is attached to the arm or other body member of a patient, as shown in FIG. 1 and as described above. Normally, the shunt valve assembly 14 is in the position shown in FIGS. 2 and 4 whereby the shunt passages 36 of the rotary member 30 shunts the flow of blood back to the artery and vein of the patient, through the tubular members 18. In this position, the open passages 34 of the rotary member 30 are aligned with the passages 26b and 26d of the body member 24 to permit cleaning thereof by forcing an appropriate cleaning fluid through the passages while the device is attached to the patient's arm. When the artificial kidney is to be employed, the tubular conduits 22 leading from the artificial kidney are inserted into the passages 26c of the body member 24 of the shunt valve assembly 14 and the rotary member 30 is rotated 90° from the position shown in FIGS. 2 and 4. In such a position, the open passages 34 connect the passages 26a and 26c of the body member 24 and thereby connect the artery and vein (through the tubular members 18) to the artificial kidney and permit the flow of blood therebetween. In this position, the ends of the shunt passages 36 are aligned with the passages 26b and 26d to permit cleaning of the shunt passages while the device is connected with the artificial kidney.

FIGS. 5 through 7 show a modified form of shunt valve assembly, generally designated 52, having a pair of tubular members 54 connecting the shunt valve assembly to the artery and vein of a patient. On the opposite side of the shunt valve assembly, a pair of tubular conduits 56a and 56b extend from the shunt valve assembly to the artificial kidney or dialysis machine 58. The shunt valve assembly includes a body member 60 in which are formed two pairs of passages 62a and 62b disposed diametrically on opposite sides of a rotary shunt valve member 64 which is disposed in a cylindrical recess 66 in the body member 60.

The rotary shunt valve member 64 has a pair of through passages 68 and a pair of shunt passages 70, similar to the embodiment shown in FIGS. 1–4, whereby the valve member 64 is operable on rotation to open the passages 62a and 62b through the valve member passages 68 (as shown in FIG. 5) or shunt the flow of blood back through the passages 62a and 62b (as shown in FIG. 6).

The embodiment of the invention shown in FIGS. 5–7 is operated and cleaned as follows. When the patient is connected to the dialysis machine, the through passages 68 in the rotary shunt valve member 64 connect the passages 62a, 62b in the valve body to connect the artery and vein of the patient to the dialysis machine, as seen in FIG. 5. In this position, the shunt passages 70 are inoperative. When the patient is to be removed from the dialysis machine, the rotary valve member 64 first is turned to an off or intermediate position as shown in FIG. 7 by rotating the valve member through a small angle to interrupt the alignment of the through passages 68, as well as the shunt passages 70, with the passages 62a, 62b in the valve body 60. Both conduits 56a, 56b from the dialysis machine are disconnected from the valve body 60. One of the valve body passages 62b is capped and a syringe is attached to the other of the valve body passages 62b. The rotary valve member 64 then is turned back to the position shown in FIG. 5 and the uncapped passages 62b are flushed with a cleaning fluid such as Heparin from the syringe. The valve member 64 again is turned to the off or intermediate position shown in FIG. 7 and the syringe is removed from the uncapped valve body passages 62b and said passage is capped. The cap on the other of the passages 62b is removed and the syringe is inserted therein. The rotary valve member 64 then is turned back to the position shown in FIG. 5 and the other of the passages 62b is flushed with Heparin. The valve then is turned to the position shown in FIG. 6 to connect a shunt passage 70 with the two valve body passages 62a connected to the artery and vein of the patient. The valve body passages 62b remain capped and the through passages 68 in the valve member 64 are filled with Heparin. Either shunt passage 70 may be flushed by aligning them with the valve body passages 62b.

FIG. 5 shows an arrangement for sensing bubbles or the like in the stream of blood flowing from the dialysis machine to the shunt valve assembly 52, and automatically closing the rotary shunt valve 64 as a result of sensing a bubble in said stream. More particularly, a bubble sensor, generally designated 76, is provided for sensing bubbles in the conduit 56b which directs the flow of blood from the dialysis machine to the shunt valve assembly and thus to the patient. The bubble sensor is operatively connected by appropriate circuitry 78 to an electric motor or other actuator 80 which in turn is operatively connected by appropriate means 82 to the rotary shunt valve 64. Thus, as a bubble passes through the conduit 56b, the bubble is sensed by the sensor 76 which in turn actuates the motor 80 to rotate the valve member 62 to the off position. An alarm 84 also may be provided and actuated by the bubble sensor 76 to signal the patient, nurse, or machine operator so that the valve member 64 may be rotated to the shunt position shown in FIG. 6 so as to shunt the bubble back to the dialysis machine 58 and thereby prevent the bubble from passing into the blood system of the patient. The actuator or motor 80 might be set to turn the valve member 64 completely to the shunt position. By providing such a warning system, the device may be operated by unskilled personnel or by the patient himself to insure that the patient will not be injured.

The foregoing detailed description has been given for clearness of understanding only and no unnecessary limitations should be understood therefrom as some modifications will be obvious to those skilled in the art.

I claim:

1. A shunt valve device for selectively connecting a patient's artery and vein to a dialysis machine, such as an artificial kidney or the like, comprising a shunt valve assembly having passage means therethrough and valve means operable to selectively open and close the passage means, means for mounting said shunt valve assembly on a body member of the person, means for connecting the passage means of said shunt valve assembly to the artery and vein of the patient, means on the shunt valve assembly for receiving conduit means from the dialysis machine and holding the conduit means in communication with said passage means whereby said valve means can be operated to open said passage means and thereby connect the artery and vein to the dialysis machine and permit the flow of blood therebetween, means to shunt the flow of blood back to the body member when said passage means is closed, and openings in said shunt valve assembly to permit cleaning at least a portion of said passage means when the flow of blood is shunted back to the body member.

2. In a shunt valve device for selectively connecting a patient's artery and vein to a dialysis machine, such as an artificial kidney or the like, including a shunt valve assembly having passage means therethrough including both through and shunt passages and valve means operable to selectively open and close the passage means, means for mounting said shunt valve assembly on a body member of the patient, means on the shunt valve assembly receiving conduit means from the dialysis machine and holding the conduit means in communication with said passage means whereby said valve means can be operated to open said through passage means and thereby connect the artery and vein to the dialysis machine and permit the flow of blood therebetween, a bubble sensor operatively connected to said conduit means, an actuator means operatively connected to said valve means and to said bubble sensor whereby a bubble passing from the dialysis machine toward said shunt valve assembly is detected by said bubble sensor which in turn actuates said actuator to close said through passage means.

3. The shunt valve device of claim 2 wherein the shunt passage of said valve means shunts the flow of the patient's blood back to the body member when the through passage means is closed.

4. The shunt valve device of claim 2 wherein the shunt passage of said valve means shunts the flow of blood back to the dialysis machine when said through passage means are closed so as to return said bubble back to the artificial kidney.

5. The shunt valve device of claim 2 including a warning device to signal when said bubble sensor has sensed a bubble.

6. A shunt valve device for selectively connecting a patient's artery and vein to a dialysis machine, such as an artificial kidney or the like, comprising a shunt valve assembly having through passage means for connecting the artery and vein of the patient to the dialysis machine, a shunt passage means for connecting the patient's artery and vein together, means for mounting said shunt valve assembly on a body member of the person, means for connecting either of said passage means of said shunt valve assembly to the artery and vein of the person, means on the shunt valve assembly for receiving conduit means from the artificial kidney and holding the conduit means in communication with said through passage means, and valve means operable to selectively open and close said passage means whereby in one position of the valve means the patient's artery and vein are connected to the dialysis machine to permit the flow of blood therebetween and in another position the patient's artery and vein are connected together.

7. The shunt valve device of claim 6 including passage means selectively opened and closed by said valve means and operable to shunt the flow of blood back to the dialysis machine when said through passage means is closed.

* * * * *